US011785084B2

(12) United States Patent
Basak et al.

(10) Patent No.: US 11,785,084 B2
(45) Date of Patent: Oct. 10, 2023

(54) MACHINE LEARNING BASED ASSIGNMENT OF SERVICE LEVELS IN A NETWORKED STORAGE SYSTEM

(71) Applicant: NETAPP, INC., Sunnyvale, CA (US)

(72) Inventors: Jayanta Basak, Bangalore (IN); Ameet Deulgaonkar, Bangalore (IN); Siddhartha Nandi, Bangalore (IN)

(73) Assignee: NETAPP, INC., San Jose, CA (US)

( * ) Notice: Subject to any disclaimer, the term of this patent is extended or adjusted under 35 U.S.C. 154(b) by 443 days.

(21) Appl. No.: 16/193,347

(22) Filed: Nov. 16, 2018

(65) Prior Publication Data

US 2019/0394273 A1    Dec. 26, 2019

Related U.S. Application Data

(60) Provisional application No. 62/687,402, filed on Jun. 20, 2018.

(51) Int. Cl.
*H04L 67/1097* (2022.01)
*H04L 41/12* (2022.01)
(Continued)

(52) U.S. Cl.
CPC ......... *H04L 67/1097* (2013.01); *G06N 20/00* (2019.01); *H04L 41/12* (2013.01); *H04L 41/14* (2013.01)

(58) Field of Classification Search
CPC .......... G06Q 10/0631; G06Q 10/06313; G06F 3/067; G06F 3/0631; G06F 3/0683; G06F 11/3409; G06F 16/217; G06F 3/0653; G06F 9/5061; G06F 3/0665; G06F 3/0607; G06F 3/061; G06F 9/5077; G06F 3/064; G06F 11/3442; G06F 9/5022; G06F 2212/502;
(Continued)

(56) References Cited

U.S. PATENT DOCUMENTS 7,181,578 B1 * 2/2007 Guha ................ G06F 3/0607
711/154
7,640,345 B2 * 12/2009 Nair ........................ H04L 41/12
709/226
(Continued)

OTHER PUBLICATIONS

Keller et al.; "Defining and Monitoring Service Level Agreements for dynamic e-Business"; Proceedings of the 16th System Administration Conference (LISA 20020; The USENIX Association, Philadelphia, PA, USA; Nov. 2002.

*Primary Examiner* — Tonia L Dollinger
*Assistant Examiner* — Linh T. Nguyen
(74) *Attorney, Agent, or Firm* — LOZA & LOZA, LLP; Tejinder Singh

(57) ABSTRACT

Methods and systems for a networked storage system is provided. One method includes transforming by a processor, performance parameters associated with storage volumes of a storage system for representing each storage volume as a data point in a parametric space; generating by the processor, a plurality of bins in the parametric space using the transformed performance parameters; adjusting by the processor, bin boundaries for the plurality of bins for defining a plurality of service levels for the storage system based on the performance parameters; and using the defined plurality of service levels for operating the storage system.

20 Claims, 8 Drawing Sheets

(51) Int. Cl.
*H04L 41/14* (2022.01)
*G06N 20/00* (2019.01)

(58) Field of Classification Search
CPC ........... G06F 3/0629; G06F 2211/1028; G06F 3/0689; G06F 11/3485; G06F 11/3452; G06F 3/0604; H04L 67/1097; H04L 41/16; H04L 41/5003; H04L 41/5019; H04L 43/08; H04L 67/322; H04L 67/1014; H04L 41/12; H04L 41/14; G06N 20/00
See application file for complete search history.

(56) References Cited

U.S. PATENT DOCUMENTS

| | | | | |
|---|---|---|---|---|
| 7,693,983 | B1 * | 4/2010 | Gupta | H04L 12/1471 |
| | | | | 709/221 |
| 8,447,946 | B2 * | 5/2013 | Nakatogawa | G06F 3/0665 |
| | | | | 711/165 |
| 9,215,085 | B2 | 12/2015 | Kruglick | |
| 9,372,637 | B1 * | 6/2016 | Alatorre | G06F 16/955 |
| 9,754,303 | B1 | 9/2017 | Jagtap et al. | |
| 9,846,545 | B2 | 12/2017 | Karale et al. | |
| 9,858,327 | B2 * | 1/2018 | Alatorre | G06F 16/955 |
| 9,916,097 | B1 * | 3/2018 | Martin | G06F 3/061 |
| 10,007,434 | B1 * | 6/2018 | Martin | G06F 3/0605 |
| 10,225,162 | B1 * | 3/2019 | Jain | H04L 12/24 |
| 10,691,350 | B2 * | 6/2020 | Rusenas | G06F 3/067 |
| 2002/0156840 | A1 * | 10/2002 | Ulrich | G06F 16/10 |
| | | | | 709/203 |
| 2006/0236061 | A1 * | 10/2006 | Koclanes | G06F 3/0605 |
| | | | | 711/170 |
| 2010/0122020 | A1 * | 5/2010 | Sikdar | G06F 3/0665 |
| | | | | 711/103 |
| 2010/0287408 | A1 * | 11/2010 | Kopylovitz | G06F 11/1092 |
| | | | | 714/6.12 |
| 2013/0254508 | A1 * | 9/2013 | Patil | G06F 3/0674 |
| | | | | 711/170 |
| 2016/0357450 | A1 * | 12/2016 | Rao | G06F 3/06 |
| 2017/0031600 | A1 * | 2/2017 | Kesavan | G06F 3/0665 |
| 2017/0324813 | A1 | 11/2017 | Jain et al. | |
| 2019/0140918 | A1 * | 5/2019 | Xu | G06F 9/45558 |

\* cited by examiner

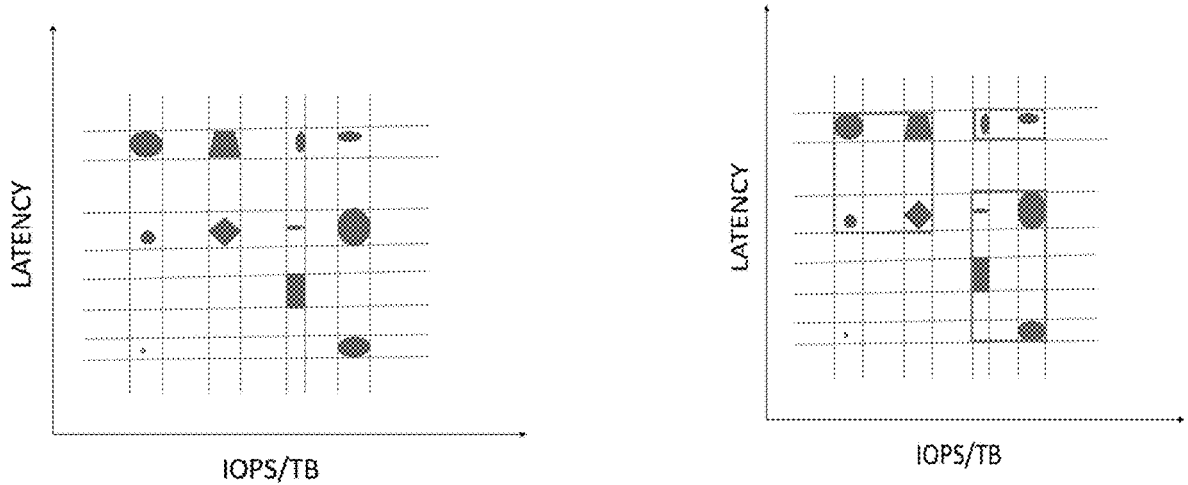
FIG. 1J
FIG. 1K
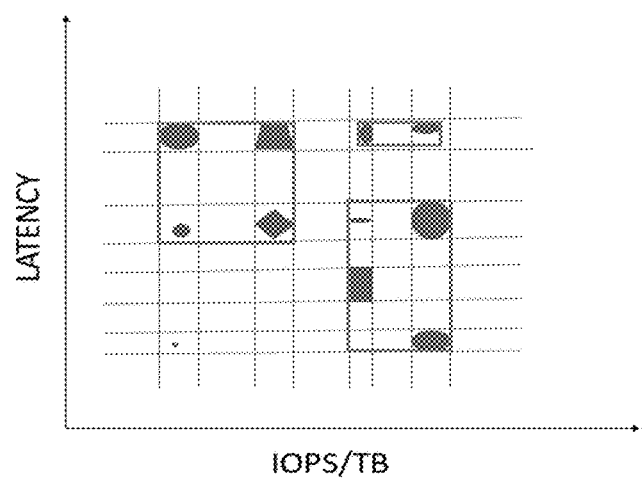
FIG. 1L

MACHINE LEARNING BASED ASSIGNMENT OF SERVICE LEVELS IN A NETWORKED STORAGE SYSTEM

CROSS-REFERENCE TO RELATED APPLICATION

This patent application claims priority under 35 USC § 119(e) to U.S. Provisional Patent Application Ser. No. 62/687,402 filed on Jun. 20, 2018, entitled, "Machine Learning Based Assignment of Service Levels in a Networked Storage System", the disclosure of which is incorporated herein by reference in its entirety.

TECHNICAL FIELD

The present disclosure relates to networked storage systems, and particularly, to providing computing technology for defining custom service levels in a networked storage system using machine learning.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Cloud computing enables information technology infrastructure with both compute and storage resources to be consumed as a service. This has motivated traditional storage solution vendors, for example, NetApp Inc., the assignee of this application to develop mechanisms for delivering storage as a service as opposed to simply selling hardware configurations and then letting customers determine service delivery. Because customers think of networked storage systems in terms of service, there is a need for computing technology to efficiently define custom service levels based on the ability and usage of resources of a data center. Continuous efforts are being made to develop computing technology for efficiently managing a networked storage system providing customized service levels.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures:

FIGS. 1D-1L illustrate the process of FIG. 1C for defining custom service levels, according to one aspect of the present disclosure;

DETAILED DESCRIPTION

Figure 1A:
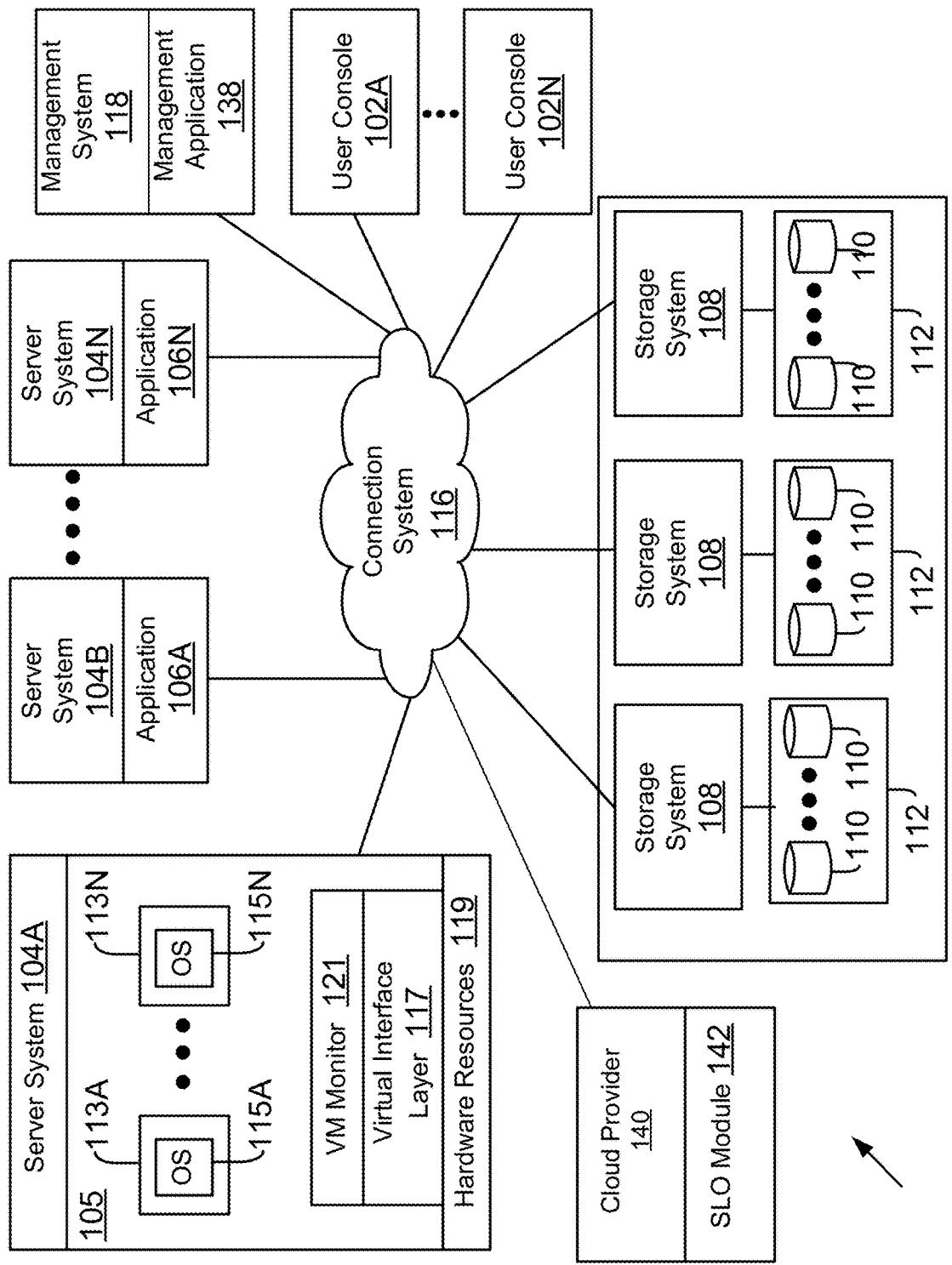
FIG. 1A shows an example of an operating environment for implementing the various aspects of the present disclosure.

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

The system and techniques described herein are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this disclosure, the application allows a client to access storage via a cloud.

After the application layer, is a cloud platform and cloud infrastructure, followed by a "server" layer that includes hardware and computer software designed for cloud specific services. Details regarding these layers are not germane to the inventive aspects.

Conventional cloud computing technology today uses a static set of service levels for providing computing and storage services. Service levels are typically based on service level objectives (SLOs) that define operating parameters for computing and storage services. For example, a SLO may define a certain latency level for reading and writing data and/or executing a certain number of input/output operations per second (IOPS) in a networked storage system.

SLOs in conventional systems are typically defined by a rigid, menu-based, hierarchical levels, for example, Gold, Silver and Bronze, or Tier I, II and III service levels. A Gold service level provides a certain service level that may be higher than a Silver service level. This static approach fails to consider the actually operating environment of a networked storage system and the overall performance/utilization of the resources of the networked storage system at any given time. This approach is also undesirable for a data center, where a user may want to transition an existing storage infrastructure into a SLO based management framework for providing access to storage resources.

The conventional static approach is also undesirable for a cloud service provider that may not be familiar with the underlying applications and storage infrastructure. Therefore, the static, menu based approach, where service levels are defined by a standard menu are either too coarse, requiring significant upgrades in storage system infrastructure that will result in higher costs, or may cause significant degradation in service levels that may result in user dissatisfaction.

In the conventional storage environment, an existing storage infrastructure transitions to SLO-based management manually by analyzing existing workloads and then manually defining a service-level menu for providing storage as a service. The manual approach can be tedious and inefficient because a data center uses a large number of resources/storage objects for management with complex interactions, and also deploys diverse workloads.

In one aspect, innovative computing technology is provided to enable users to define custom service levels for providing storage and storage services based on storage system resource capabilities. The innovative computing technology, implemented by a SLO module, addresses the challenges of optimal SLO design and assignment of SLOs to storage workloads with minimal manual intervention.

In one aspect, the SLO module retrieves performance data associated with different resources of a storage system. The performance data may be retrieved from a management system, for example, NetApp OnCommand® Insight (OCI) (without derogation of any trademark rights) that is connected to various storage controllers (or systems) and collects performance data from the storage systems. The SLO module applies machine-learning-based optimization algorithms for generating custom service level definitions and assignment of service levels to storage volumes across different storage systems.

Before describing the details of the SLO module, the following provides an overview of a networked storage environment where the various adaptive aspects of the present disclosure can be implemented.

System 100: FIG. 1A shows an example of a networked operating environment 100 (also referred to as system 100), for implementing the various adaptive aspects of the present disclosure. In one aspect, system 100 may include a plurality of computing systems 104A-104N (may also be referred to and shown as server system (or server systems) 104 or as host system (or host systems) 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles (or computing devices) 102A-102N (may be referred to as user 102 or client system 102).

A cloud provider 140 may be used to provide storage and storage related services (e.g. backup restore, cloning and other services) to clients. The cloud provider 140 may execute a SLO module 142 for customizing service levels for storage system 108 in a data center. It is noteworthy that the SLO module 142 may be executed by server systems 104 or any other computing device. The adaptive aspects disclosed herein are not limited to any specific location for implementing the SLO module 142.

Server systems 104 may be computing devices configured to execute applications 106A-106N (may be referred to as application 106 or applications 106) over a variety of operating systems, including the UNIX® and Microsoft Windows® operating systems. Applications 106 may utilize data services of storage system 108 to access, store, and manage data in a set of storage devices 110 that are described below in detail. Applications 106 may include a database program, an email program or any other computer executable program.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104A executes a virtual machine environment 105, according to one aspect. In the virtual machine environment 105, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual machine environment 105 includes a plurality of VMs 113A-113N that execute a plurality of guest OS 115A-115N (may also be referred to as guest OS 115) to share hardware resources 119. As described above, hardware resources 119 may include CPU, memory, I/O devices, storage or any other hardware resource.

A virtual machine monitor (VMM) 121, for example, a processor executed hypervisor layer provided by VMWare Inc., Hyper-V layer provided by Microsoft Corporation (without derogation of any third party trademark rights) or any other virtualization layer type, presents and manages the plurality of guest OS 115. VMM 121 may include or interface with a virtualization layer (VIL) 117 that provides one or more virtualized hardware resource 119 to each guest OS. For example, VIL 117 presents physical storage at storage devices 110 as virtual storage (for example, as a virtual hard drive (VHD)) to VMs 113A-113N. The VMs use the VHDs to store information at storage devices 110.

In one aspect, VMM 121 is executed by server system 104A with VMs 113A-113N. In another aspect, VMM 121 may be executed by a separate stand-alone computing system, often referred to as a hypervisor server or VMM server and VMs 113A-113N are presented via another computer system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may include one or more computing systems for retrieving storage system 108 performance data and providing the same to SLO module 142. Management system 118 may also execute or include a management application 138 that processes performance data retrieved from the storage system 108, as described below in detail. The performance data is provided to SLO module 142 for defining custom service levels.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 121 as a storage volume or one or more qtree sub-volume units including logical unit numbers (LUNs). Each storage volume may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 113A-113N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104.

The storage system 108 maintains a plurality of counters (not shown) to track various performance parameters. For example, the storage system 108 tracks latency for processing input/output (I/O) requests for clients for each storage volume. The storage system 108 may also track the number IOPS for each volume, the storage capacity that is used for each volume and any rate of change of storage capacity utilization. The performance data maintained by the storage system 108 is provided to the management application 138. The performance data is also regularly provided to the SLO module 142 for defining custom service levels as described below in detail.

In one aspect, storage system 108 may have a distributed architecture, for example, a cluster based system that may include a separate network module and storage module, described below in detail with respect to FIG. 2A. Briefly, the network module is used to communicate with server systems 104 and management system 118, while the storage module is used to communicate with the storage devices 110.

Figure 1B:
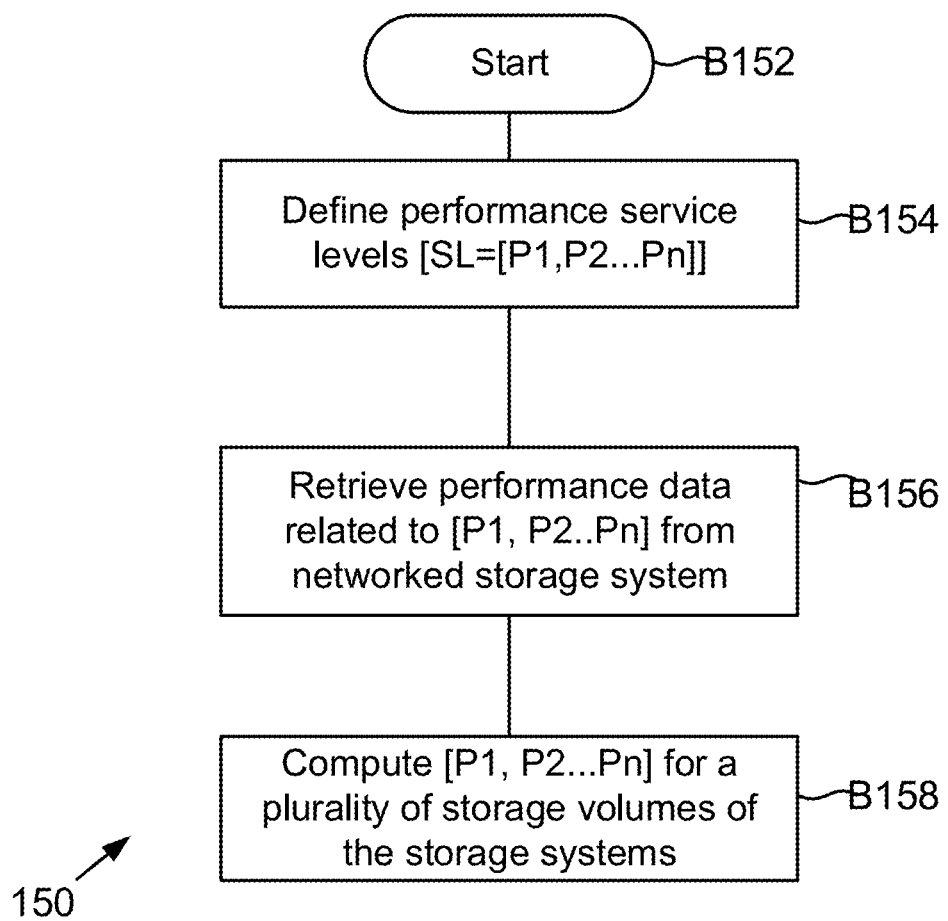
FIG. 1B shows a process flow for defining performance parameters used for discovering custom service levels of a networked storage environment, according to one aspect of the present disclosure.

SLO Module 142 Operations: FIG. 1B shows a process 150 for computing performance parameters to define custom service levels for a data center having a plurality of resources, including computing systems, storage devices, network devices and other resources (e.g. system 100). The process begins in block B152.

Figure 1C:
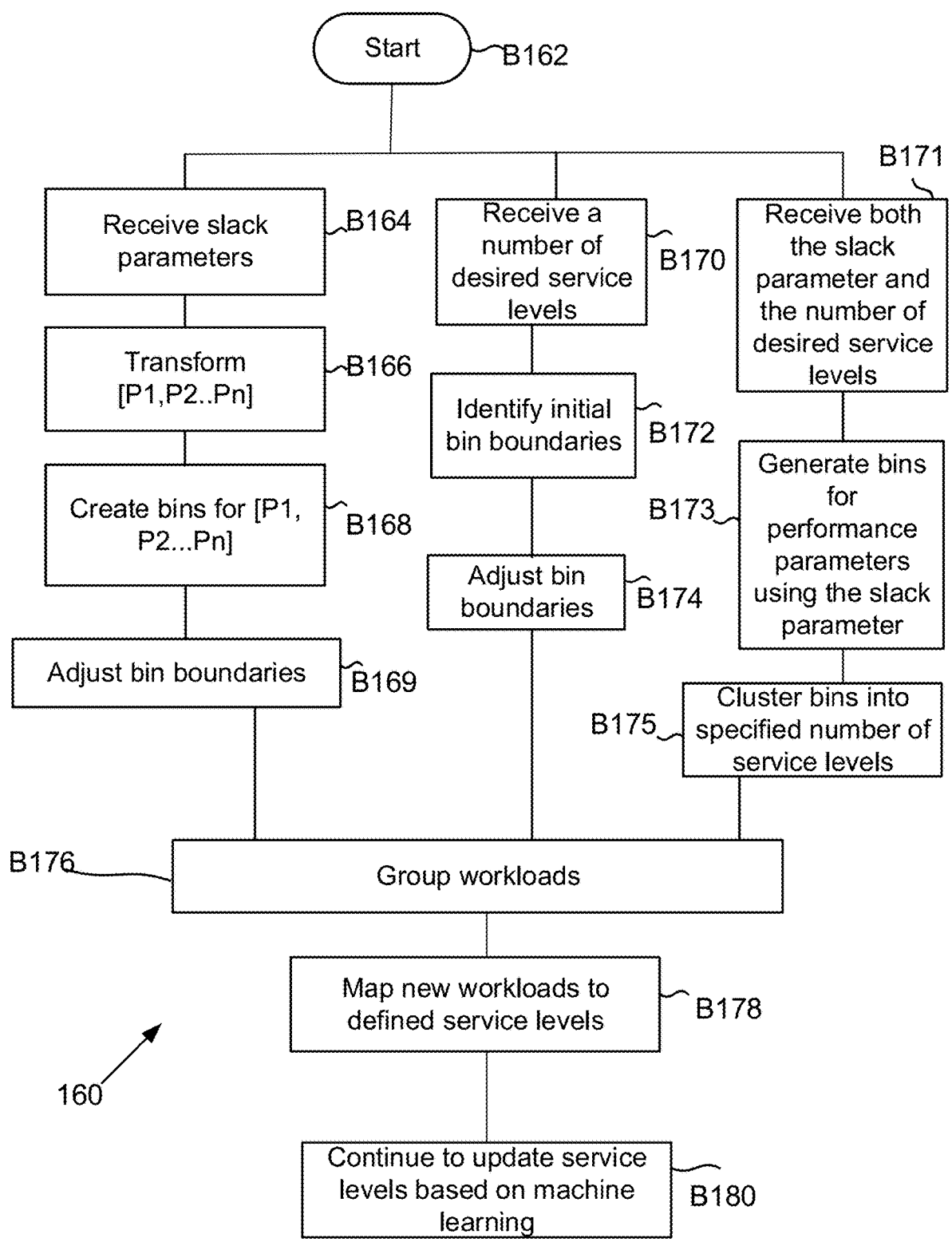
FIG. 1C shows an example of a process for defining custom service levels based on machine learning, according to one aspect of the present disclosure.

In block B154, performance parameters, P1-Pn, are defined for generating customized service levels. The number of performance parameters may vary. In one aspect, the SLO module 142 uses peak I/O density and peak latency for each storage volume to define custom service levels such that storage volumes can be mapped to certain service levels and a "slack" (i.e. deviation from a defined service level) is minimal. The process for determining the custom service levels is shown in FIG. 1C and described below in detail.

In block B156, the performance data related to P1-Pn (e.g. latency, IOPS, storage capacity utilization and other data) is retrieved from the storage system 108. As an example, performance data is retrieved from the management application 138. The performance parameters P1-Pn are computed by the SLO module 142 in block B158.

In one aspect, the SLO module 142 determines the peak latency and the peak I/O (input/output) density for each workload. The term workload as used herein means a storage volume that is used for storing and retrieving data.

Peak latency is computed by the SLO module 142 based on volume level latency (i.e. average latency for a storage volume) over a period of time, for example, a month. The term latency as used herein means delay in processing I/O requests for a volume. The storage system 108 maintains various counters to track the latency for each storage volume. The management application 138 retrieves the information from the storage system 108 [Block B156]. The peak latency is computed as a certain percentile of the overall observation [Block B158]. For example, the 99th percentile or the 95th percentile of average latency may be used to represent peak latency. The maximum value is not considered as a peak because the maximum value may occur due to system aberrations.

Peak I/O density is computed by the SLO module 142 based on the number of IOPS and a used capacity of a specific volume [B158]. In one aspect, the peak I/O density is computed over a period of time. The SLO module 142 matches' time stamps of IOPS and used capacity measurements, and for each time stamp, the I/O density is determined as a ratio of IOPS and the used capacity for each volume. Once the I/O density for each time stamp is determined over a period of time (for example, 1 month), the SLO module 142 selects a certain percentile (99th or 95th) of the observations to identify the peak I/O density for each volume.

FIG. 1C shows a machine learning, process flow 160 for defining service levels based on a data center's capability at any given time. The custom service levels optimize use of computing and networking resources of the data center. The novel computing technology of the present disclosure provides an interactive mechanism for defining service levels that the data center can support. The term data center and networked storage system are used interchangeably throughout this specification.

In one aspect, the SLO module 142 uses a workload-centric approach for defining different service levels so that workloads are accurately matched to appropriate service levels. In one aspect, the SLO module 142 uses "slack" with respect to I/O density and latency to indicate workload deviation from service level definitions. If the number of service levels is small, then manageability becomes easier but slack may become large, and the user unnecessarily pays more for storage services. On the other hand, a higher number of service levels results in lower storage infrastructure cost and increases overall manageability cost, since more service levels have to be supported by the data center.

The SLO module 142 provides an interactive computing tool in which a user can specify the number of service levels, slack; or both the slack and the number of service levels for defining service levels. As described below in detail, in the first case for specified number of service levels, volume performance parameters are clustered into a number of specified service levels. In the second case where slack is specified, the volume parameters are binned into several "bins", each having a size specified by slack parameters. In the third case for both slack and number of service levels, the volume performance parameters are binned using the slack parameter and then the bins are further clustered into a specified number of service levels, as described below.

As an example, the SLO module 142 defines slack as a percentage of the peak I/O density and the peak I/O latency for a service level definition. The percentage is transformed into a logarithmic scale to represent the I/O density and latency. Therefore, if the SLO definition of I/O density is I and slack is p %, then in the log scale, the I/O density is represented as log 2(I) and the deviation of the I/O density from the definition level is defined as: s=log 2(I(1+p/100)/I)=log 2(1+p/100).

For 100% slack, s=1 and the I/O density in the logarithmic scale is partitioned into bins of width=1. Similarly, if slack=300%, then s=2. The portioned bins of width=2 in the logarithmic scale. The same convention may be used to specify the slack for latency.

The SLO module 142 bins a volume parameter space along peak I/O density and peak latency dimensions. In one aspect, workloads are represented by single points (peak I/O density, peak latency) in a space defined by the peak I/O density and peak latency. The bin boundaries represent a corresponding SLO granule. A granule is data or information with certain variations defined by granule boundaries.

The SLO module 142 determines granules by binning the volume parameter space. Once the SLO granules are determined, they are clustered depending on a number of specified service levels.

Referring back to FIG. 1C, process 160 begins in block B162. The SLO module 142 may receive slack parameters in block B164, the number of desired service levels in block B170 or both the slack parameter and the number of desired service levels in block B171. These parameters may be received via a CLI (command line interface), a GUI (graphical user interface) or an API (application programming interface) executed by a computing device (e.g. cloud provider 140).

When only the slack parameter is received, then in block B166, the performance data is transformed, initial bins are created in block B168 and the bin boundaries are adjusted in block B169, as described below in detail.

In one aspect, when only slack is specified, the SLO module 142 uses the slack values in the log scale for both peak latency and peak I/O density. The peak I/O density and peak latency are transformed in a log scale [B166]. For example, assume that the peak I/O density in the log scale ranges from $I_{min}$ to $I_{max}$. The SLO module 142 creates bins in the log scale as ($I_{max}$ to $I_{max}$-s) and ($I_{max}$-s to $I_{min}$) [B168]. The bin boundaries are adjusted such that a minimum of the first bin matches the minimum parameter value of the points falling within that bin [B169]. Similarly, the maximum of the second bin matches the maximum parameter values of the points falling in the second bin. The maximum of the second bin is modified to $I'_{max}<I_{max}$-s. The bins are then partitioned by ($I_{max}'$ to $I_{max}'$-s) and ($I_{max}'$-s to $I_{min}$). The boundary of the newly created second bin is adjusted by ($I_{max}'$-s) such that the maximum parameter values falling in the newly created second bin (may be referred to as the third bin) matches the maximum. The process of block B169 continues until the minimum of the newly created first bin is less than or equal to the $I_{min}$. It is noteworthy that process blocks B166-B169 are executed by a computing device for improving overall SLO management in a data center.

Similarly, the SLO module 142 partitions latency in the log scale by using the specified slack. All possible combinations of I/O density and latency of these bins in individual dimensions are used to construct two-dimensional granules. The total number of workloads present in each granule are determined, and if the number is less than a certain threshold, the granule is ignored and may be referred to as an invalid granule.

When only the number of desired service levels is specified [block B170], then the initial bin boundaries are identified in block B172 and adjusted in block B174. In one aspect, this is executed by the SLO module 142 as follows:

As an example, for I/O density, DI (Delta I)=$(I_{max}-I_{min})$. The SLO module 142 computes dI=DI/n, where n is the number of specified service levels. In one aspect, DI is divided by a number larger than n. In such cases, finer granules are obtained which result in lower slack.

For example, dI=DI/(5*n), then ($I_{max}$ to $I_{max}$-dI) and ($I_{max}$-dI to $I_{min}$) are constructed as two bins [B172]. The bin boundary values are adjusted to match actual parameter values [B174]. Next the SLO module 142, computes the width of each bin. For example, let the widths be $w_1$ and $w_2$. If (5*n)>2, then the bin with the highest width is selected and dI is computed as =width/(the number of remaining bins+1). For example, if (5*n)=10 then dl=width/9. The bin is partitioned using ($I_{max}$' to $I_{max}$'-dI) and ($I_{max}$'-dI to $I_{min}$'), where $I_{max}$' and $I_{min}$' are boundaries of the bin.

The foregoing processor executable process continues until the entire space is divided into, e.g., (5*n) bins. The same process is used for peak latency, and for all possible combinations of peak latency and peak I/O density.

In one aspect, two-dimensional granules are constructed. The valid and invalid granules are identified by comparing the number of volumes present in each granule with a threshold value. For example, let a maximum of k workloads be allowed to be unmapped out of N workloads. The SLO module 142 computes the percentage as k/N. If there are C granules (C=m*n in the first case and (5*n)² in the second case), then the threshold is set as k/(C*N).

In block B176, the various workloads or volumes are grouped. The workloads are grouped by clustering valid granules. Each valid granule is represented as one point for clustering represented by the center. The SLO module 142 does not consider the number of workloads within each granule, so that each granule gets the same importance. In other words, the data density of the granules is not considered, so that the service level definitions with a higher number of workloads cannot distort the definitions with a smaller number of workloads.

In one aspect, the SLO module 142 uses a hierarchical clustering process to cluster the granule centers, using max(.) distance. Max(.) distance between two points in space A=$[x_1,y_1]$ and B=$[x_2,y_2]$ is defined as Dist(A,B)=max ($|x_1-x_2|$, $|y_1-y_2|$). Since this distance does not make the diagonal distance more than the distance in any individual dimension, by using this distance the rectangular clusters are determined. The maximum corner point of each cluster (max peak I/O density, max peak latency) is represented as the service-level definition of a corresponding cluster. If the number of service levels is specified, the granules are clustered into the specified number (n). If the number of service levels is not specified, then each valid granule is considered as a service level.

When both slack and number of desired service levels are received by the SLO module 142, then in block B173 bins are generated and adjusted using the slack parameter, as described above. The bins are also clustered into specified number of service levels.

After the workloads are grouped, in block B178, a new workload is mapped to a defined service level based on the performance parameters for the workload. The service-level definitions are represented as a set of tuples (peak I/O density, peak latency) and may be stored at a storage device.

To map any new workload, the SLO module 142 finds its peak I/O density and peak latency, say (i,lt). Let the service level definitions be given as $(I_1,L_1), (I_2,L_2), \ldots, (I_k,L_k)$. The SLO module 142 finds all service levels for which i<I and obtains $k_1$ for the service levels. From $k_1$, the service levels for which lt<L are determined. Thereafter, the SLO module 142 determines $k_2$ for such definitions. The difference (I–i) for all such $k_2$ possibilities are determined and mapped to the level where the difference is minimal.

It is noteworthy that the service levels can be updated in block B180, as the data center continues to operate and machine learning is used to better understand the overall resource usage and performance of the resources of the data center.

FIGS. 1D-1L illustrate binning a parameter space, finding valid granules, and then grouping the granules, as described above with respect to FIGS. 1B and 1C, respectively.

Figure 1D:
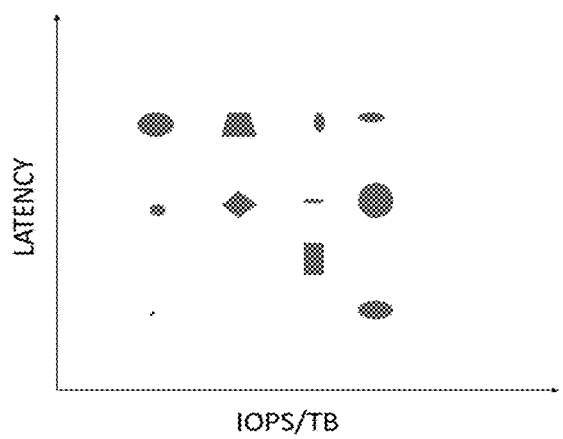

FIG. 1D shows the distribution of sample values. The shapes approximate some distributions and the sizes show the number of samples. In this example, a sample represents the peak I/O density and the peak latency of a volume that is represented as a single point in a space defined by latency and I/O density. The geometric shapes show a simplified view of the distribution of latency and I/O density of different volumes concentrated in that space.

Figure 1E:
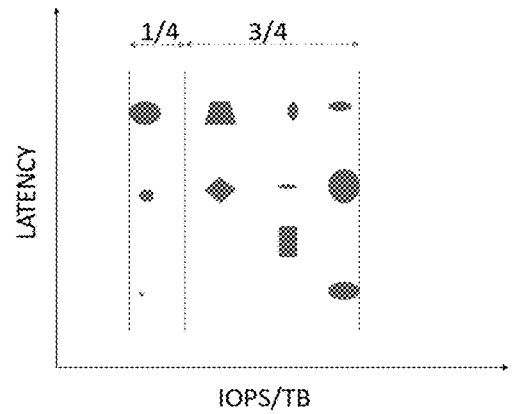

FIG. 1E illustrates the bounds of I/O density (minimum peak I/O density and maximum peak I/O density for all volumes). The latency and I/O density space is partitioned into 4×4 grids and partitioned into $\frac{1}{4}^{th}$ and $\frac{3}{4}^{th}$ segments.

Figure 1F:
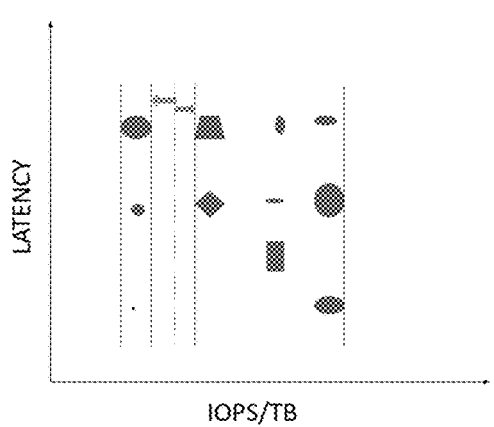

FIG. 1F show that the boundaries of the $\frac{1}{4}^{th}$ and $\frac{3}{4}^{th}$ zones are adjusted.

Figure 1G:
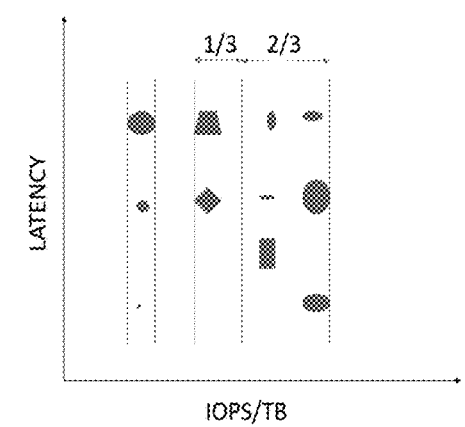

As shown in FIG. 1G, the SLO module 142 determines that the $\frac{3}{4}^{th}$ zone is wider than the $\frac{1}{4}^{th}$ zone after boundary adjustment. The $\frac{3}{4}^{th}$ zone is further partitioned into $\frac{1}{3}^{rd}$ and $\frac{2}{3}^{rd}$.

Figure 1H:
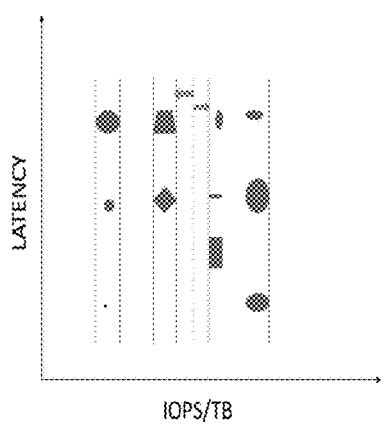

FIG. 1H shows that the bin boundaries are again adjusted.

Figure 1I:
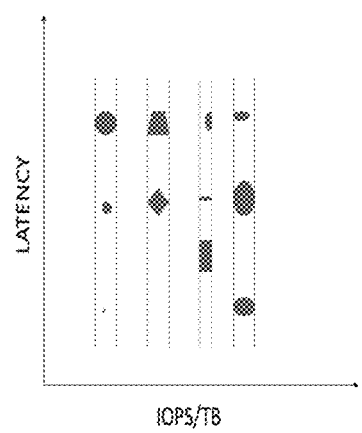

FIG. 1I shows that four different bins are found by the SLO module 142. The width of the I/O density bins depends on data distribution, and are not equal.

FIG. 1J shows the process of FIG. 1D-1H for the latency space to find four bins for latency. Thus, the SLO module 142 obtains a 4×4 grid with 16 granules, out of which 12 granules may have a considerable number of samples and one granule may have a very low number of samples. The granule with very low number of samples is ignored.

FIG. 1K shows that the 12 granules are clustered using max(.) distance to obtain clusters of quadratic shapes. To cluster, the SLO module 142 does not consider the number of samples present within the granules and only the granule centroids are considered, as described above.

FIG. 1L shows that after the clusters are generated, the cluster boundaries are adjusted to find the maximum peak I/O density and the maximum peak latency. The pair of maximum peaks for every cluster is used to define the corresponding service level. As an example, FIG. 1L shows three service levels.

In one aspect, the automatic discovery/definition of custom service levels can be implemented in different data centers. The SLO module 142 may also use conventional, pre-set, service level definitions. This provides options for data centers to map volumes by using pre-set definitions as well as to discover new definitions that are specific to data center capabilities.

When automatic discovery is used, it reduces the I/O density slack and reduces the number of unmapped volumes. This is useful for cloud service providers that may want to have tighter control on the slack to provide well-defined service levels.

In conventional systems, SLO definitions have traditionally been treated as a manual process based on the experience and expertise of a storage system expert. Conventional techniques do not discover SLO definitions using big data or machine-learning techniques, as described above. The present disclosure provides a methodology of automatic discovery of SLO definitions that are customized for a data center's capability. This reduces dependency on manual expertise.

In one aspect, methods and systems for a networked storage system is provided. One method includes transforming by a processor, performance parameters associated with storage volumes of a storage system for representing each storage volume as a data point in a parametric space; generating by the processor, a plurality of bins in the parametric space using the transformed performance parameters; adjusting by the processor, bin boundaries for the plurality of bins for defining a plurality of service levels for the storage system based on the performance parameters; and using the defined plurality of service levels for operating the storage system.

Clustered Storage System: FIG. 2A depicts an illustrative aspect of a shared, storage environment 200 where custom service levels can be defined using the SLO module 142. The shared, storage environment 200 includes the management system 118, the cloud provider 140, a plurality of server systems 204.1-204.2 (similar to server systems 104), a clustered storage system 202 and at least one computer network 206 communicably connecting the server systems 204.1-204.2 and the clustered storage system 202. The functionality of the cloud provider 140, the SLO module 142 and the management system 118 is described above in detail.

The clustered storage system 202 includes a plurality of nodes 208.1-208.3, a cluster switching fabric 210, and a plurality of mass storage devices 212.1-212.3 (similar to 110, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Figure 2A:
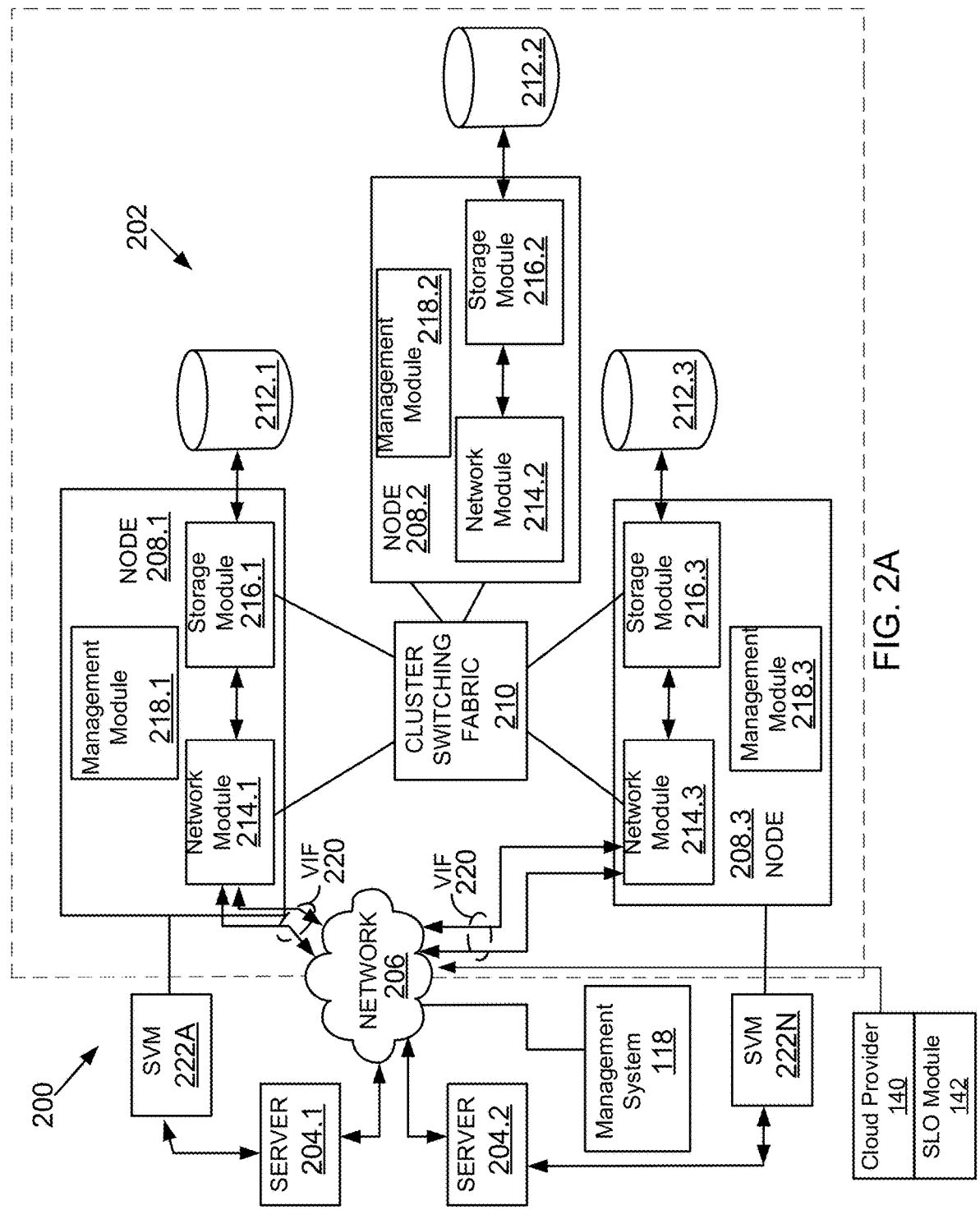
FIG. 2A shows an example of a clustered storage system, used according to one aspect of the present disclosure.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
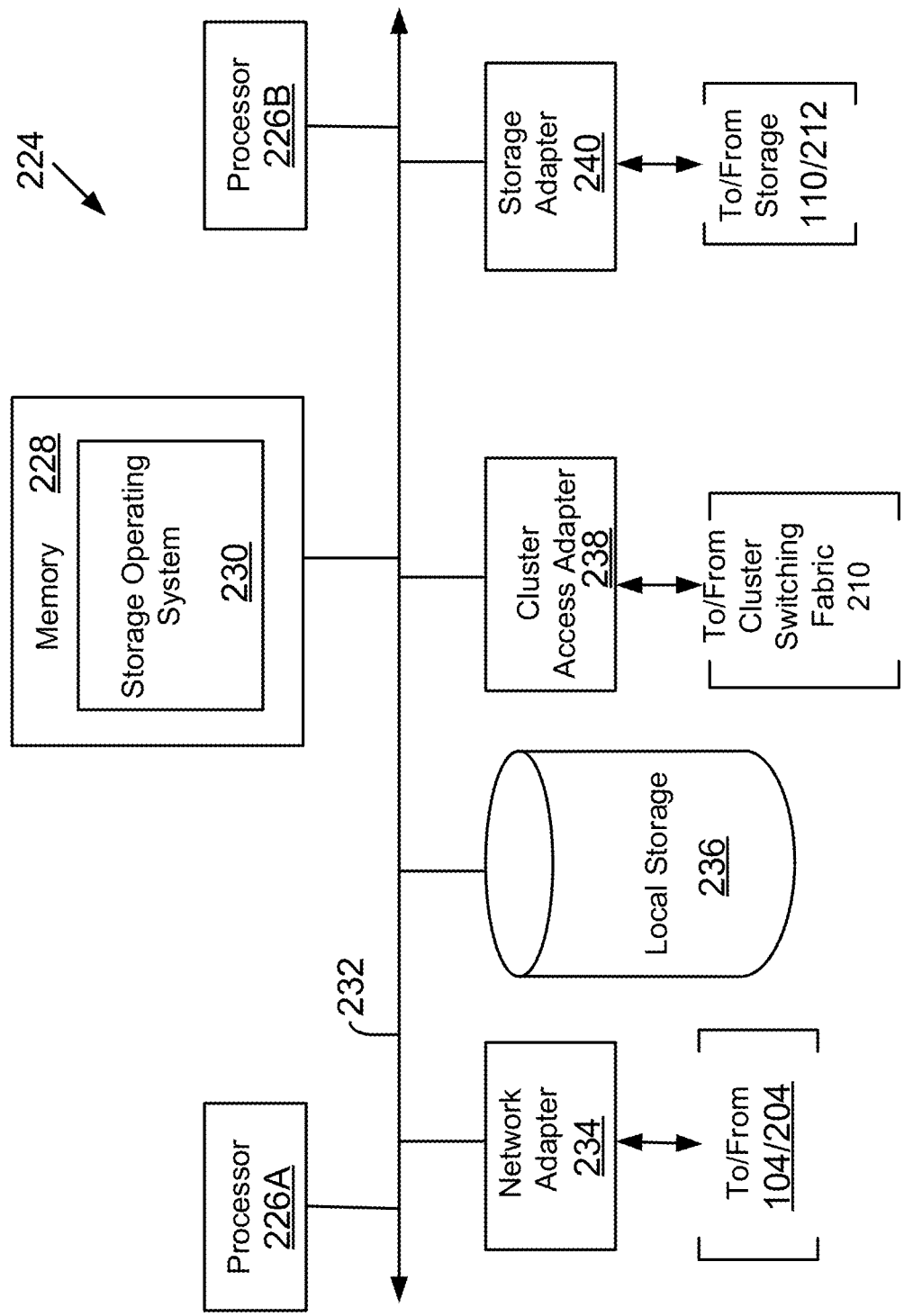
FIG. 2B shows an example of a storage system node, used according to one aspect of the present disclosure.

Storage System Node: FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
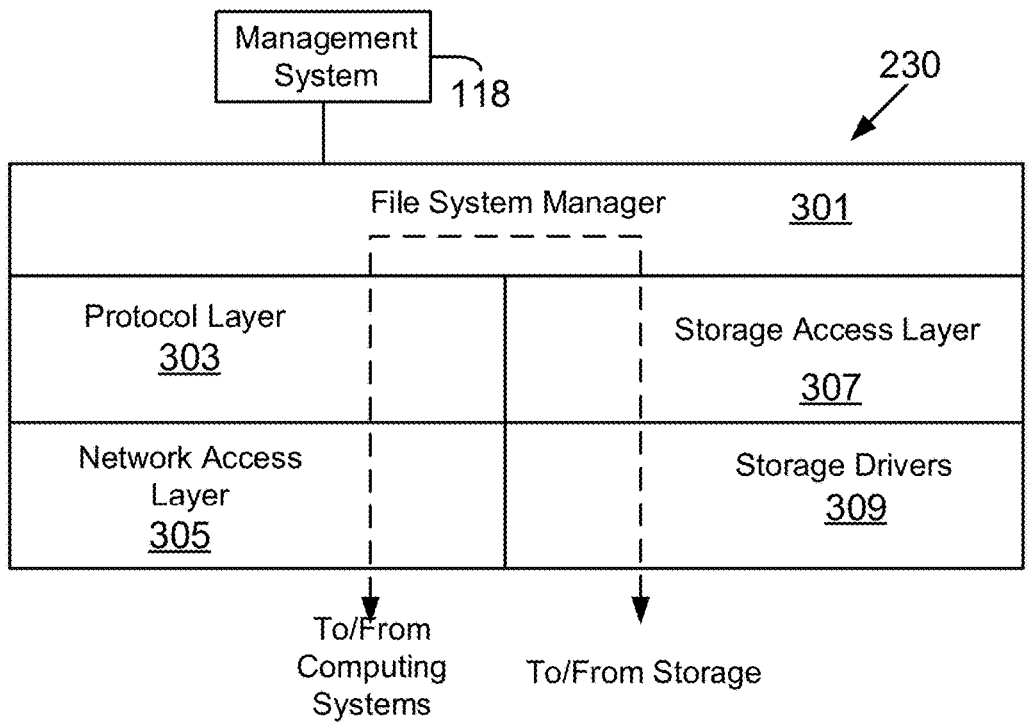
FIG. 3 shows an example of a storage operating system, used according to one aspect of the present disclosure.

Operating System: FIG. 3 illustrates a generic example of operating system 230 executed by storage system 108, according to one aspect of the present disclosure. Storage operating system 230 interfaces with the management system 118 for providing performance data that can be used to define custom service levels, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 104 and mass storage devices 110/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
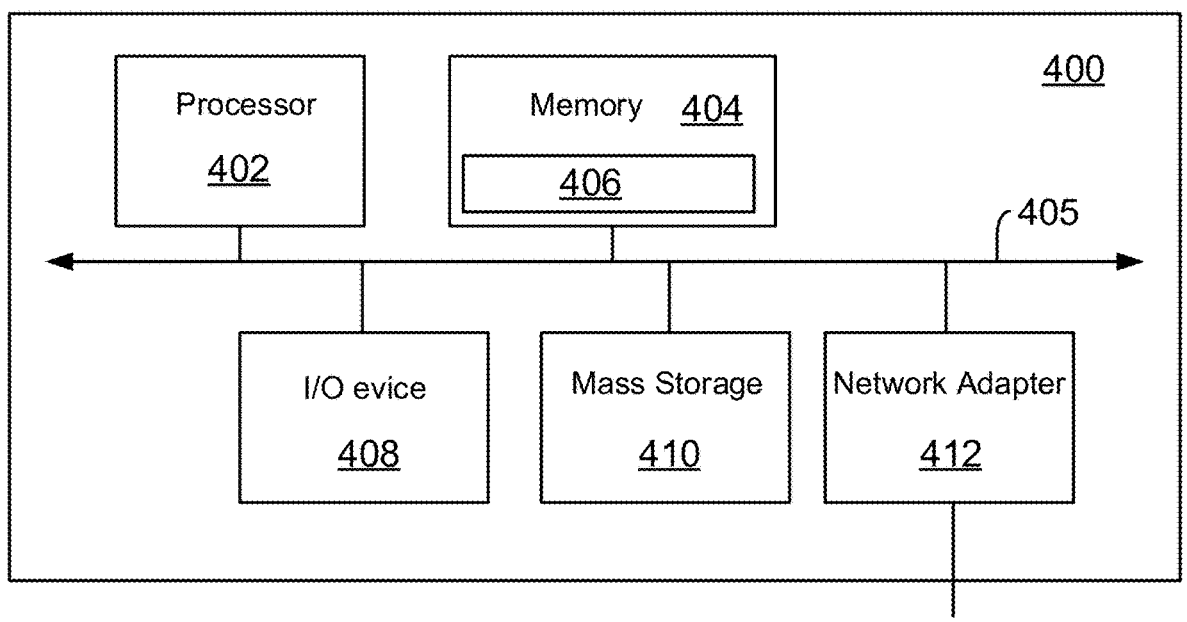
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of management system 118, user console 102, server systems 104, cloud provider 140 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by the SLO module 142 as well as instructions for executing the process blocks of FIGS. 1B and 1C.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, methods and systems for dynamically defining service levels for a data center have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising;
transforming, by a processor, performance parameters associated with storage volumes of a storage system for representing each storage volume within a parametric space, the parametric space defined by the transformed performance parameters;
generating, by the processor, a plurality of bins in the parametric space, each bin having one or more storage volumes with associated transformed performance parameters;
adjusting, by the processor, bin boundaries for the plurality of bins, based on a specified deviation for one or more of the transformed performance parameters;
generating, by the processor, a plurality of granules across the adjusted bin boundaries, each granule including at least a storage volume with corresponding transformed performance parameters;
selecting, by the processor, a subset of granules from the plurality of granules, based on each granule of the subset having a threshold number of storage volumes;
defining, by the processor, a plurality of custom service levels for the storage system, based on a number of granules in the selected subset and a desired number of custom service levels; and
using the defined plurality of custom service levels for operating the storage system.

2. The method of claim 1, wherein the transformed performance parameters include a peak latency value for each storage volume.

3. The method of claim 1, wherein the transformed performance parameters include a peak Input/output (I/O) density for each storage volume.

4. The method of claim 1, further comprising: receiving, by the processor, a specified number of service levels for defining the desired number of custom service levels; and selecting, by the processor, granules within the subset that are closest in distance.

5. The method of claim 1, further comprising: receiving, by the processor, a specified deviation limit for the transformed performance parameters for defining the specified deviation; and adjusting, by the processor, bin boundaries with a first bin including at least a minimum parameter value and a second bin includes at least a maximum parameter value.

6. The method of claim 1, further comprising: receiving, by the processor, a specified deviation limit for the transformed performance parameters for defining the specified deviation, and a specified number of service levels for defining the plurality of custom service levels; and updating, by the processor, the custom service levels based on actual usage of resources of the storage system.

7. The method of claim 1, wherein a new storage volume of the storage system is mapped to one of the defined, plurality of custom service levels.

8. A system comprising:
a memory containing machine readable medium comprising machine executable code having stored thereon instructions; and a processor coupled to the memory configured to execute the machine executable code to:
transform performance parameters associated with storage volumes of a storage system for representing each storage volume within a parametric space, the parametric space defined by the transformed performance parameters;
generate a plurality of bins in the parametric space, each bin having one or more storage volumes with associated transformed performance parameters;
iteratively adjust bin boundaries for the plurality of bins, based on a specified deviation for one or more of the transformed performance parameters;
generate a plurality of granules across the adjusted bin boundaries, each granule including at least a storage volume with corresponding transformed performance parameters;
select a subset of granules from the plurality of granules, based on each granule of the subset having a threshold number of storage volumes;
define a plurality of custom service levels for the storage system, based on a number of granules in the selected subset and a desired number of custom service levels; and
use the defined plurality of custom service levels for operating the storage system.

9. The system of claim 8, wherein the transformed performance parameters include a peak latency value for each storage volume.

10. The system of claim 8, wherein the machine executable code further causes to: receive a specified number of service levels for defining the desired number of custom service levels; and select granules within the subset that are closest in distance.

11. The system of claim 8, wherein the machine executable code further causes to: receive a specified deviation limit for the transformed performance parameters for defining the specified deviation; and adjust bin boundaries with a first bin including at least a minimum parameter value and a second bin includes at least a maximum parameter value.

12. The system of claim 8, wherein the machine executable code further causes to: receive a specified deviation limit for the transformed performance parameters for defining the specified deviation, and a specified number of service levels for defining the plurality of custom service levels; and update the custom service levels based on actual usage of resources of the storage system.

13. The system of claim 8, wherein a new storage volume of the storage system is mapped to one of the defined, plurality of custom service levels.

14. A non-transitory machine readable storage medium having stored thereon instructions for performing a method, comprising machine executable code which when executed by at least one machine, causes the machine to:
transform performance parameters associated with storage volumes of a storage system for representing each storage volume within a parametric space, the parametric space defined by the transformed performance parameters;
generate a plurality of bins in the parametric space, each bin having one or more storage volumes with associated transformed performance parameters;
iteratively adjust bin boundaries for the plurality of bins, based on a specified deviation for one or more of the transformed performance parameters;
generate a plurality of granules across the adjusted bin boundaries, each granule including at least a storage volume with corresponding transformed performance parameters;
select a subset of granules from the plurality of granules, based on each granule of the subset having a threshold number of storage volumes;
define a plurality of custom service levels for the storage system, based on a number of granules in the selected subset and a desired number of custom service levels; and
use the defined plurality of custom service levels for operating the storage system.

15. The non-transitory machine readable storage medium of claim 14, wherein the transformed performance parameters include a peak latency value for each storage volume.

16. The non-transitory machine readable storage medium of claim 14, wherein the transformed performance parameters include a peak Input/Output (I/O) density for each storage volume.

17. The non-transitory machine readable storage medium of claim 14, wherein the machine executable code which when executed, further causes the machine to: receive a specified number of service levels for defining the desired number of custom service levels; and select granules within the subset that are closest in distance.

18. The non-transitory machine readable storage medium of claim 14, wherein the machine executable code which when executed, further causes the machine to: receive a specified deviation limit for the transformed performance parameters for defining the specified deviation; and adjust bin boundaries with a first bin including at least a minimum parameter value and a second bin includes at least a maximum parameter value.

19. The non-transitory machine readable storage medium of claim 14, wherein the machine executable code which when executed, further causes the machine to: receive a specified deviation limit for the transformed performance parameters for defining the specified deviation, and a specified number of service levels for defining the plurality of custom service levels; and update the custom service levels based on actual usage of resources of the storage system.

20. The non-transitory machine readable storage medium of claim 14, wherein a new storage volume of the storage system is mapped to one of the defined, plurality of custom service levels.

* * * * *